United States Patent [19]
Adler et al.

[11] Patent Number: 5,458,541
[45] Date of Patent: Oct. 17, 1995

[54] FRICTION-DAMPER TENSIONING SYSTEM FOR BELT OR CHAIN DRIVES

[75] Inventors: Hellmut Adler, Herzogenaurach; Rudolf Polster, Baiersdorf; Michael Schmid, Hochstadt/Aisch, both of Germany

[73] Assignee: Ina Walzlager Schaeffler KG, Germany

[21] Appl. No.: 356,329

[22] PCT Filed: Jul. 10, 1993

[86] PCT No.: PCT/EP93/01809

§ 371 Date: Dec. 15, 1994

§ 102(e) Date: Dec. 15, 1994

[87] PCT Pub. No.: WO94/02757

PCT Pub. Date: Feb. 3, 1994

[30] Foreign Application Priority Data

Jul. 27, 1992 [DE] Germany .................. 42 24 759.4

[51] Int. Cl.⁶ .................................................. F16H 7/08
[52] U.S. Cl. .................................................. 474/135
[58] Field of Search ........................ 474/101, 109, 474/111, 113–117, 133–138

[56] References Cited

U.S. PATENT DOCUMENTS

| | | | |
|---|---|---|---|
| 5,030,172 | 7/1991 | Green et al. ................ | 474/135 |
| 5,250,009 | 10/1993 | Sidwell et al. ................ | 474/135 |
| 5,348,514 | 9/1994 | Sidwell et al. ................ | 474/135 |

FOREIGN PATENT DOCUMENTS

| | | |
|---|---|---|
| 0000841 | 2/1979 | European Pat. Off. . |
| 2708488 | 8/1978 | Germany . |
| 3225411 | 2/1983 | Germany . |
| 3414027 | 4/1985 | Germany . |
| 4124636 | 1/1993 | Germany . |

OTHER PUBLICATIONS

International Search Report No. PCT/EP93/01809 29 Oct. 1993.

*Primary Examiner*—Michael Powell Buiz
*Attorney, Agent, or Firm*—Bierman and Muserlian

[57] ABSTRACT

The invention relates to a tensioning system for a belt or chain drive. Tensioners are known in which there are plastic friction bushes to damp oscillations where the coefficient of friction is adversely affected by temperature effects. It is the purpose of the invention to provide a tensioning system in which the friction coating retains a virtually constant frictional torque throughout its useful life. To this end, according to the invention there is a basic component (2) in which against a base (5) in the shape of a circular disc bears a friction coating (18) on which is supported a friction disc (10) which is secured against rotation by means of a shaft (7), to the tensioner (9) producing the oscillating movement.

5 Claims, 1 Drawing Sheet

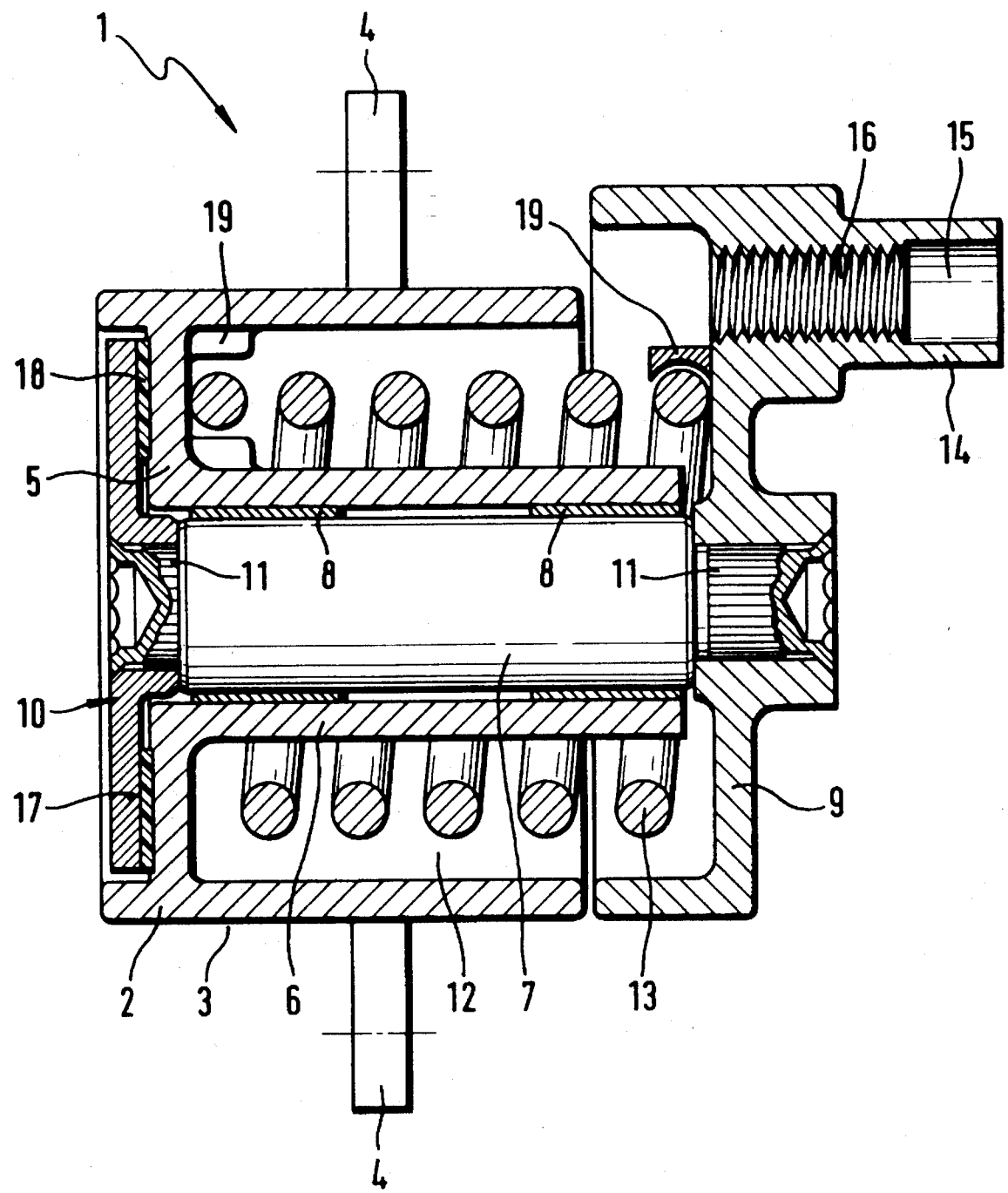

FRICTION-DAMPER TENSIONING SYSTEM FOR BELT OR CHAIN DRIVES

The invention relates to a friction-damped tensioning system for belt or chain drives which is preferably used in internal combustion engines according to the features of the preamble of claim 1.

An arrangement of this type can be found in DE-A-32 25 411. According to it a housing is provided on which is disposed a tensioning part swivellable unilaterally for receiving a tension roller. By means of a screw carried centrally through the housing the arrangement is fastened for example on the crankcase of an internal combustion engine. The shaft of the screw is encompassed in the housing by a bearing part on whose surface area a torsion spring, implemented as helical spring, is carried which is braced at one end on the flange of the bearing part and on the opposing end on the swivellable tensioning part. Between the flange of the bearing part and a carrier plate of the arrangement is inserted a damping device. When installed, the torsion spring causes a displacement of the tensioning roller in order to maintain a given belt tension force by horizontally swinging the tensioning part. This leads to a damped setting movement through the damping device. As the damping device serves an elastomer friction disk in which the coefficient of friction is negatively influenced by the temperature. To attain a high service life of the friction coating, which means avoidance of impermissible heating and high wear-and-tear, an enlargement of the friction surface or a reduced spring force are necessary. Both measures negatively affect the function or the required construction space of the arrangement.

It is therefore the task of the invention to provide a tensioning arrangement which ensures a nearly constant moment of friction independently of the temperature over the lifetime of the tensioning system, and which has a low degree of wear-and-tear and requires a relatively small friction surface.

This task is solved according to the invention through the features listed in the characterizing part of claim 1.

According to the invention a friction coating comprising an organic material is provided. The advantageously used asbestos-free material exhibits material properties whose maximum surface pressure reaches 2 $N/mm^2$ and thus markedly exceeds the value of 0.5 $N/mm^2$, common for synthetic materials (for example elastomers or thermoplastics). The coefficient of friction of the material according to the invention has temperature-dependent changes which are negligible compared to synthetic materials. Due to the higher permissible surface pressure it is possible to use a friction coating with smaller radial dimensions, which, consequently, permits the implementation of the entire tensioning arrangement requiring a smaller constructional space. This results in significant cost advantages.

The constructional design of the tensioning arrangement provides the division of the spring force of the loaded torsion spring through which, in the direction of the circumference, prestress is exerted onto the belt or the chain and the friction coating used for damping is exclusively acted upon by an axial force. Independently of the position of the tensioning part relative to the basic part, no dependence on the moment of friction occurs according to the invention since the friction element and, consequently, the friction coating is acted upon by an axial force which remains constant.

The friction coating is advantageously also not exposed to deformation work of any kind which, in the case of prior tensioning systems, has prevented maintaining a constant coefficient of friction and therefore has decreased the service life of the friction coating.

As a suitable material for the friction coating is used according to the invention an asbestos-free friction material based on graphite-duroplastic-unvulcanized rubber with a synthetic fiber reinforcement which a very high wear-and-tear resistance can be attained.

In one constructional embodiment the friction disk frictionally engages the friction coating fastened on the basic part. The friction coating can alternatively be fastened on the friction disk and frictionally engage the basic part. The radial dimension and configuration of the friction coating advantageously is selected so that these agree with the force attack surface of the spring and the friction coating is separated from the spring through the base of the basic part. The inventive concept can be expanded to include a friction coating implementation in which the friction coating is neither fastened on the friction disk nor on the basic part but rather is used as a free part. The friction coating is advantageously implemented in the geometric form of an annular disk. It is alternatively possible to implement the friction coating in the form of axially or radially borne circular ring segments.

To create a low-friction bearing for the tensioning part and at the same time provide a compact construction, the shaft of the tensioning parts according to the invention is supported by a roller bearing in the basic part, and for the roller bearing at least one needle crown whose rolling bodies are used directly between the housing (basic part) and the shaft (tensioning part) both of which are provided with raceways for the rolling bodies.

The concept provides alternatively a friction bearing further reducing the radial constructional space for the bearing of the shaft.

For a further explanation of the invention reference is made to the drawing with the associated description of the Figures, in which an embodiment example further elucidates the invention.

The structure of the tensioning system 1 according to the invention is illustrated by a representation in section. Accordingly, the tensioning system 1 is provided with a basic part 2 whose shape is largely rotationally symmetric and whose cylindrical surface 3 is provided with two brackets 4 disposed radially opposite for fastening the tensioning system 1 on a housing (not shown), for example on a crankcase of an internal combustion engine. The basic part 2 is centrally provided with a sleeve 6 starting at the end of a base 5, which sleeve extends axially over the opposing end of the cylindrical surface 3. A shaft 7 set into the sleeve 6 supported via friction bearing bushings 8 establishes a rotational connection between a tensioning part 9 and a friction disk 10.

To attain a torsion-tight connection, the tensioning part 9 or the friction disk 10 is connected torsion-tight, for example by means of a tooth system 11, with the corresponding structural part, and the offset end of the shaft 7 provided with the tooth system 11 is mortised with the tensioning part 9 or the friction disk 10 for fixation of the rotation. In the hollow volume 12 extending axially from the basic part 2 into the tensioning part 9, a spring 13 is disposed as a torsion spring which is implemented as a helical spring and which, in the operating position of the tensioning system 1, always pivots the tensioning part 9 into a position increasing the belt or chain tension. For the fixation of the rotation of spring 13 its ends are secured on the base 5 or on the tensioning part 9 by means of a sheet metal holding 19. The tensioning part 9 is eccentrically provided on the front face opposing the basic part 2 with a housing extension 14 into which is introduced a setting bore 15 with an adjoining threaded bore 16. These bores 15 and 16 serve for receiving and fastening a tension roller (not shown) connected with a chain or belt drive. The friction disk 10 fastened on the tensioning part 9 and cooperating with the basic part 2 with an annular disk 17 frictionally engages the friction coating 18.

An axial force exerted by the spring 13 on the tensioning part 9 is transmitted via a shaft 7 to the friction disk 10 which exerts a force on the friction coating 18 and causes therewith an intentional damping of the motion of the tensioning part 9, for example in the event of impact loading in the belt or chain drive. The cylindrical surface 3 or the basic part 2 is extended axially over the base 5 whereby the friction coating 18 is axially and radially covered by the basic part 2 and, by including the friction disk 10, is disposed nearly completely protected.

List of Reference Numbers
1 Tensioning system
2 Basic part
3 Cylindrical surface
4 Bracket
5 Base
6 Sleeve
7 Shaft
8 Friction bearing bushing
9 Tensioning part
10 Friction disk
11 Tooth system
12 Hollow space
13 Spring
14 Housing extension
15 Setting bore
16 Threaded bore
17 Friction surface
18 Friction coating
19 Sheet metal holding

We claim:

1. Friction-damped tensioning system for belt or chain drives, in particular used in internal combustion engines, with a stationary basic part (2) comprising a sleeve (6) over which is borne a pivotable tensioning part (9) and, between the basic part (2) and the tensioning part (9), a spring (13), bracing and rotating both structural parts with respect to one another, is used and for damping the operating motions of the tensioning part (9) a friction element acted upon in the direction of the force of the spring (13) and upon a friction disk (10) of the friction element connected torsion-tight with the tensioning part (9) exclusively an axial force acts and the friction disk (10) is in contact with the basic part (2) by means of a friction coating (18), characterized in that an asbestos-free friction material based on graphite-duroplastic-unvulcanized rubber with a fiber reinforcement is provided as friction coating (18).

2. Friction-damped tensioning system as stated in claim 1, characterized in that the friction coating (18) can be acted upon with a surface pressure of the order of magnitude of 2 N/mm$^2$.

3. Friction-damped tensioning system as stated in claim 1, characterized in that the friction coating (18) has the geometric form of an annular disk.

4. Friction-damped tensioning system as stated in claim 1, characterized in that a cylindrical surface (3) of the basic part (2) covers the friction disk (10) axially and radially.

5. Friction-damped tensioning system as stated in claim 1, characterized in that the shaft (7) is supported in the sleeve (6) by roller bearings by means of at least one needle crown.

\* \* \* \* \*